United States Patent
Scharf et al.

(10) Patent No.: US 12,535,584 B2
(45) Date of Patent: Jan. 27, 2026

(54) METHOD FOR SUPPLEMENTARY DETECTION OF OBJECTS BY A LIDAR SYSTEM

(71) Applicant: Robert Bosch GmbH, Stuttgart (DE)

(72) Inventors: Andreas Scharf, Stuttgart (DE); Florian Mauch, Talheim (DE); Johannes Richter, Ludwigsburg (DE); Remigius Has, Grafenau-Daetzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1094 days.

(21) Appl. No.: 17/456,964

(22) Filed: Nov. 30, 2021

(65) Prior Publication Data

US 2022/0179077 A1 Jun. 9, 2022

(30) Foreign Application Priority Data

Dec. 3, 2020 (DE) ...................... 10 2020 215 312.4

(51) Int. Cl.
*G01S 17/42* (2006.01)
*G01S 7/481* (2006.01)
*G01S 17/931* (2020.01)

(52) U.S. Cl.
CPC ............ *G01S 17/42* (2013.01); *G01S 7/4814* (2013.01); *G01S 7/4816* (2013.01); *G01S 17/931* (2020.01)

(58) Field of Classification Search
None
See application file for complete search history.

(56) References Cited

U.S. PATENT DOCUMENTS

2016/0018526 A1* 1/2016 Van Den Bossche ...................... G01S 7/4802 356/5.03
2019/0391270 A1* 12/2019 Uehara ................... G01S 17/04

FOREIGN PATENT DOCUMENTS

DE 102016124197 A1 6/2018

* cited by examiner

*Primary Examiner* — Hovhannes Baghdasaryan
(74) *Attorney, Agent, or Firm* — NORTON ROSE FULBRIGHT US LLP

(57) ABSTRACT

A method for the supplementary detection of objects by a LIDAR system. The LIDAR system is configured to scan a solid angle range to carry out a primary distance determination method for surroundings objects. An emitter unit emits at least one laser beam in a solid angle strip of the solid angle range, laser light reflected from surroundings objects being received by a detector unit to ascertain the distance and the position of surroundings objects with the aid of the primary distance determination method. The method includes: scanning the entire solid angle range and subsequently generating a two-dimensional intensity distribution of the detected signal light. This is followed by generating a corrected two-dimensional intensity distribution by removing blooming signals and analyzing the corrected two-dimensional intensity distribution for the supplementary detection of surroundings objects in addition to the primary distance determination method.

9 Claims, 2 Drawing Sheets

METHOD FOR SUPPLEMENTARY DETECTION OF OBJECTS BY A LIDAR SYSTEM

The present invention relates to a method for supplementary detection of objects by a LIDAR system, the LIDAR system being configured to scan a solid angle range in order to carry out a primary distance determination method for surroundings objects, the LIDAR system including at least one emitter unit and at least one detector unit, and the emitter unit emitting at least one laser beam in a solid angle strip of the solid angle range, the laser light reflected from surrounding objects being received by the detector unit in order to ascertain the distance and the position of surrounding objects with the aid of the primary distance determination method. The present invention additionally relates to a LIDAR system including a control unit, which is configured to carry out the steps of such a method.

BACKGROUND INFORMATION

Highly and fully automated vehicles (level 3-5) will be found more and more on our roads in the coming years. Various autonomous driving functions, for example, for congestion situations or in general for driving situations on motor vehicle roads, are presently being developed. All of these systems generally combine greatly varying sensors (e.g., video cameras, LIDAR, radar, ultrasonic sensors). In particular LIDAR sensors play a more and more important role for autonomously driving vehicles.

The high point rates of LIDAR sensors required for real time and accurate recognition of surroundings objects make it necessary to measure multiple measuring points simultaneously—this is referred to as parallelization of the measurements. The scene to be measured may be illuminated using a vertical laser strip (also called "vertical flash LIDAR"), for example, and imaged in the receiving path on a vertical detector array, so that each detector element (detector pixel) of the detector unit covers one measuring point in the space. The measuring time is greatly reduced by such parallelization, since a complete column of points (in a solid angle strip having a certain horizontal extension) is measured simultaneously (a line or even a 2D arrangement of points/detector elements/detector pixels may be measured in parallel according to the same principle).

However, the LIDAR sensor is also more strongly susceptible to crosstalk of the optical signal within a column (also called blooming) in the case of such approaches. This crosstalk is particularly strong for highly reflective targets, for example, retroreflective objects (e.g., traffic signs), which under certain circumstances may also trigger other measuring points of the column. In such a case, the object to be measured appears greatly enlarged in the point cloud and under certain circumstances may even cover the entire vertical field of view. In this case, the LIDAR sensor would be blind in certain areas (e.g., under a retroreflective sign gantry). It is therefore necessary to develop LIDAR architectures which enable a high degree of parallelization but prevent blindness due to blooming at the same time.

The presence of blooming effects due to a very high signal intensity is to be attributed to scattering processes in the signal path, for example, due to charge travel between pixels in the case of certain pixel types, e.g., due to an excessively large charge quantity in the primary imaging detector pixel, which is discharged into the adjoining detector pixels and generates misdetections therein. Blooming may occur for all detector technologies, different detector technologies encountering different challenges, however.

Thus, for example, SPAD detectors (single photon avalanche diodes) typically have a certain dead time after the detection of a photon, so that a dead zone results behind the detecting blooming points, in which the LIDAR sensor may not detect objects (typically 1-30 m, depending on the vehicle speed). APDs (avalanche photodiodes), on the other hand, are sometimes operated at a voltage which dynamically adapts to the present signal strength (see, for example, DE 10 2016 124 197 A1). This may have the result that the APD reacts less sensitively to objects behind the blooming points due to the high signal strength of the blooming points.

Furthermore, LIDAR sensors, which may only detect one echo per measuring point (for example due to limitations in the data rate), are permanently blind behind a detected blooming point.

Herein, the terms pixel, detector pixel, and detector element are used interchangeably. A detector unit is to be understood as an arrangement of multiple (or a large number of) detector elements.

SUMMARY

According to an example embodiment of the present invention, a method of the type mentioned at the outset is provided. IN accordance with an examiner embodiment of the present invention, the method includes the following steps:
scanning the entire solid angle range:
generating a two-dimensional intensity distribution of the detected signal light,
generating a corrected two-dimensional intensity distribution by removing blooming signals,
analyzing the corrected two-dimensional intensity distribution for the supplementary detection of surroundings objects in addition to the primary distance determination method.

The term "scanning the entire solid angle range" is to be understood in such a way that the LIDAR system carries out, for example, a full pivot over the solid angle range which is to be scanned for the primary distance determination method. However, this does not necessarily have to be the maximum possible solid angle range of the LIDAR system, in particular if the LIDAR system has various angle modes (e.g., for city operation, expressway operation, or certain speed ranges).

The primary distance determination method may be, for example, a time-of-flight LIDAR method or a frequency-modulated continuous wave LIDAR method (FMCW-LIDAR).

The approach according to an example embodiment of the present invention has the advantage that a redundant object recognition (in particular in the forward direction and at high speeds) may be provided if the primary distance determination method temporarily has blind spots due to blooming effects. A particularly hazardous situation would exist, for example, if, in the case of a self-driving motor vehicle, a retroreflective display panel above an expressway displayed an approaching end of a traffic jam (or a temporarily reduced speed limit) and at the same time preceding vehicles briefly could no longer be recognized due to the blooming generated by the display panel. In the worst case, this could result in delayed braking of the self-driving vehicle and thus create an accident risk.

The method according to the present invention permits a supplementary detection of surroundings objects in that the two-dimensional image data are analyzed themselves after a correction of the blooming effects. This does not permit direct distance determination from the corrected two-dimensional intensity distribution (this information, for example, by time-of-flight determination is lost due to the overload in parts of the signal path due to the blooming), but enables a supplementary recognition of surroundings objects in various ways, so that the temporary blindness of the primary distance determination method may be bridged to avoid hazardous situations.

In other words, the present invention thus uses a gray image (two-dimensional intensity distribution) to recognize objects that are possibly present behind a blooming effect. The 2D representation of the background light from each measuring point of the LIDAR system is referred to here as a gray image. The gray image therefore corresponds to a camera image of the surroundings at the wavelength of the LIDAR sensor. The advantage of the use of the background signal of the LIDAR system in contrast to the use of an external camera including sensor data fusion is that each gray image value corresponds to precisely the same solid angle as the measured primary distance determination method. Possible errors, for example, calibration errors or interpolation errors between two sensors are thus avoided. The redundancy of the object detection is improved at the same time.

The blooming signals to be removed are preferably identified in that the two-dimensional intensity distribution is searched for spatial intensity profiles characteristic of blooming signals. Blooming signals display characteristic spatial intensity profiles around a center of the blooming signal which may be fitted with the aid of curve fitting to the intensity distribution. The calculated blooming curve(s) may then be subtracted from the two-dimensional intensity distribution to obtain the corrected two-dimensional intensity distribution. The curve fitting to the intensity distribution may take place in the two-dimensional intensity distribution along one-dimensional measured value columns and/or measured value lines of the corrected two-dimensional intensity distribution or may take place two-dimensionally over the entire two-dimensional intensity distribution.

It is preferred if the step of analyzing the corrected two-dimensional intensity distribution includes analyzing the homogeneity of the corrected two-dimensional intensity distribution. In particular, the roadway typically displays a very homogeneous intensity distribution (except for roadway markings or road damage), so that other vehicles appear as clear inhomogeneities in the corrected two-dimensional intensity distribution. This method is thus based on examining the homogeneity of the grayscale in image areas having blooming effects, for example, under retroreflective sign gantries on motor vehicle roads. The method according to the present invention permits a redundant recognition of other vehicles via their reflection behavior, which deviates from the roadway, and the resulting inhomogeneity in the corrected two-dimensional intensity distribution.

In one specific embodiment of the present invention, the analyzing of the homogeneity of the corrected two-dimensional intensity distribution takes place along one-dimensional measured value columns and/or measured value lines of the corrected two-dimensional intensity distribution. For this purpose, for example, the grayscale profile may be examined in a line or column of measuring points (or detector elements/detector pixels). If no objects are present in this area, a relatively consistent grayscale is thus expected due to the homogeneity of the road. However, if a significant inhomogeneity is established, it is thus to be presumed that an object (for example another vehicle) is present.

In one preferred specific embodiment of the present invention, the step of analyzing the corrected two-dimensional intensity distribution includes a step of object recognition in the corrected two-dimensional intensity distribution. Object recognition methods may include, for example, edge recognition, size recognition, or pattern comparison to known patterns. The object recognition may also use machine learning methods or deep learning-based approaches, for example, the Viola-Jones method, scale-invariant feature transform (SIFT), speeded up robust features (SURF), or histogram of oriented gradients (HOG).

In one specific embodiment of the present invention, after the step of object recognition, those unknown objects, to which no distance could be assigned by the primary distance determination method of the LIDAR system, have a distance calculated by a size comparison to another known object in the corrected two-dimensional intensity distribution, for which a distance has been determined by the primary distance determination method. A known object may be, for example, an object which is horizontally offset from the strongly reflective object and whose detection by the primary distance determination method is therefore not influenced or only slightly influenced by blooming effects (for example, not by parts of a sign gantry covered by blooming, a lateral roadway boundary, a less reflective traffic sign, a vehicle on another lane, etc.). A size comparison to a known object of known size and distance is comparatively simple to carry out, but requires that a suitable object may also be identified at the same time.

The calculation of the distance by a size comparison preferably uses the following estimation formula:

$$d_U = d_B \frac{P_B \cdot A_U}{P_U \cdot A_B}$$

$d_U$ being the distance of the undetermined object, $d_B$ being the distance of the determined object determined by the primary distance determination method, $P_U$ being a one-dimensional extension of the undetermined object in pixels, $P_B$ being a corresponding one-dimensional extension of the determined object in pixels, $A_U$ being a typical one-dimensional extension of the undetermined object, and $A_B$ being a typical one-dimensional extension of the determined object. Even if this estimation formula is not able to supply exact distance determination for the undetermined object (due to size variations of the known object, angle effects, pixel resolution, etc.), it thus permits at least a hazard recognition and timely recognition of potential obstacles. It is furthermore possible to correct the distance of undetermined object $d_U$ as calculated above by a correction factor (for example, 10%-20%) to avoid an overestimation of the distance due to the inherent inaccuracy of the method, which could result, for example, in an excessively late braking signal of the autopilot. It is to be noted that an excessively strong reduction due to unnecessary braking maneuvers of the autopilot could also create a hazardous situation. The correction factor may also be dependent on the identified type of the determined object, thus may be less, for example, in the case of object types having very standardized size (certain traffic signs) than in the case of determined objects having a greater variation of the size (for example vehicles, in particular small cars in relation to SUVs/trucks).

It is preferred if multiple distance determinations are carried out for the same object by various pixel lines and/or pixel columns and their result is averaged to achieve an improved distance determination. Potential incorrect determinations of object extensions in certain pixel columns may thus be averaged out.

The present invention furthermore relates to a LIDAR system including a control unit which is configured to carry out the steps of the method according to one of the preceding specific embodiments of the present invention. A control unit is to be understood as a device which, for example, processes sensor signals and outputs control signals as a function thereof. The method according to the present invention may be implemented in the control unit via application-specific integrated circuits, software, firmware, or a combination thereof.

In one specific embodiment of the present invention, at least one detector unit includes a plurality of detector elements, which are avalanche photodiodes and/or single photon avalanche diodes. Avalanche photodiodes and single photon avalanche diodes are very widespread in LIDAR systems due to their very high signal sensitivity, but are therefore also particularly subject to the negative effects of blooming. Such a LIDAR system therefore particularly profits from the method according to the present invention.

The LIDAR system is preferably a motor vehicle LIDAR system, in particular for a road-bound motor vehicle, for example, a passenger vehicle or a truck or a motorcycle.

Advantageous refinements of the present invention are disclosed herein.

BRIEF DESCRIPTION OF THE DRAWINGS

Exemplary embodiments of the present invention are explained in greater detail on the basis of the figures and the following description.

DETAILED DESCRIPTION OF EXAMPLE EMBODIMENTS

Figure 1:
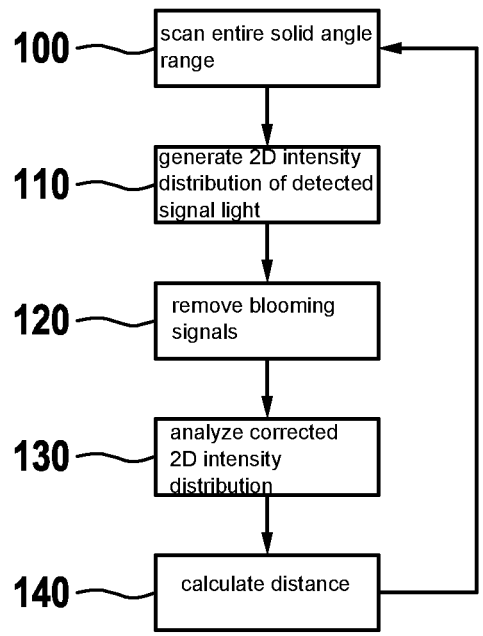
FIG. 1 shows one specific embodiment of a method according to the present invention as a flowchart.

FIG. 1 shows a flowchart of one specific embodiment of a method according to the present invention. Initially, in step 100, the entire solid angle range is scanned. In step 110, a two-dimensional intensity distribution (gray image) of the detected signal light is generated from the combined image data of the scan of the entire solid angle range. A corrected two-dimensional intensity distribution is generated in step 120 by removing blooming signals. In step 130, the corrected two-dimensional intensity distribution is analyzed to identify objects with the aid of an object recognition method or a homogeneity analysis. In step 140, after the step of object identification, for those undetermined objects to which no distance could be assigned by the primary distance determination method of the LIDAR system, a distance is calculated by a size comparison to another determined object in the corrected two-dimensional intensity distribution, for which a distance has been determined by the primary distance determination method. Subsequently, the method starts again with renewed scanning of the entire solid angle range.

Figure 2:
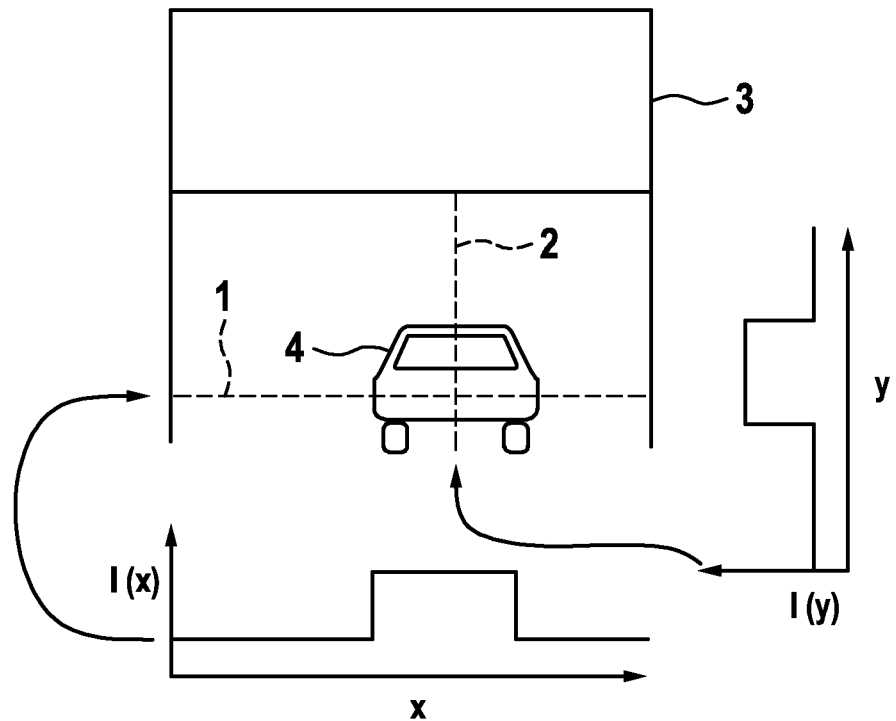
FIG. 2 shows a schematic representation of a corrected two-dimensional intensity distribution including intensity profiles along a horizontal line and a vertical column, in accordance with an example embodiment of the present invention.
Figure 3:
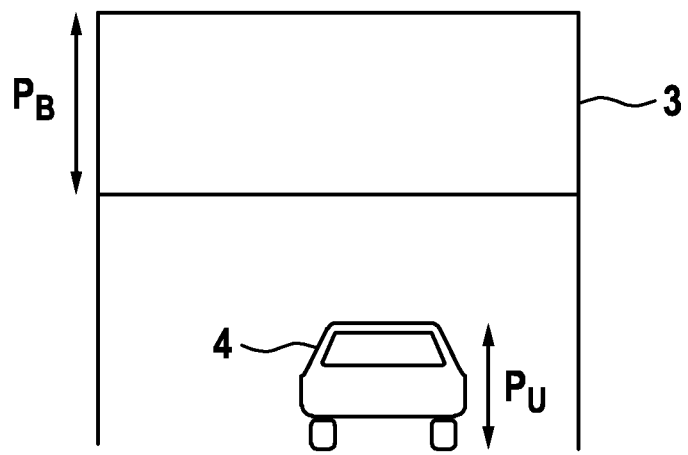
FIGS. 3 and 4 show schematic representations of the different apparent sizes of vehicles at different distances.
Figure 4:
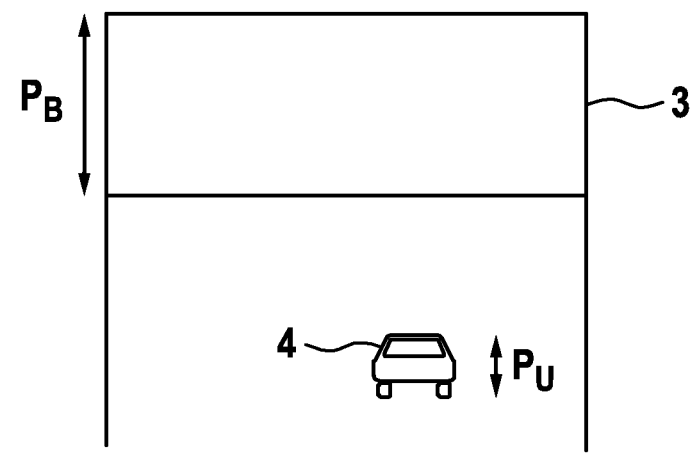

FIG. 2 shows a schematic representation of a corrected two-dimensional intensity distribution (grayscale image) including supplementary intensity profiles along a horizontal line 1 (x axis) and a vertical column 2 (y axis). The corrected two-dimensional intensity distribution includes a sign gantry 3 (which generates blooming effects that have already been removed) and a vehicle 4. The intensity profile/grayscale profile in a line 1 or column 2 may be examined individually or in combination. If no objects are present in this area, a relatively consistent grayscale is thus expected due to the typically present homogeneity of the road. However, if a significant inhomogeneity is established, as may be seen in FIG. 1, it is thus to be presumed that an object is present. FIGS. 3 and 4 show schematic representations of the different apparent sizes of undetermined objects 4 (vehicles) at different distances under a sign gantry 3. In FIG. 3, vehicle 4 is below sign gantry 3, while it is significantly behind sign gantry 3, thus farther away, in FIG. 4.

The following estimation formula may be used to calculate the distance of vehicle 4 by way of a size comparison:

$$d_U = d_B \frac{P_B \cdot A_U}{P_U \cdot A_B}$$

$d_U$ being the distance of the undetermined object, $d_B$ being the distance of the determined object determined by the primary distance determination method, $P_U$ being a one-dimensional extension of undetermined object 4 (vehicle 4) in pixels (in the vertical direction here, for example), $P_B$ being a corresponding one-dimensional extension of determined object 3 (sign gantry 3, in the vertical direction here, for example) in pixels, $A_U$ being a typical one-dimensional extension of the undetermined object 4, and $A_B$ being a typical one-dimensional extension of the determined object 3. Even if this estimation formula is not able to supply exact distance determination for undetermined object 4 (due to size variations of determined object 3, angle effects, pixel resolution, etc.), it thus permits at least a hazard recognition and timely recognition of potential obstacles. Vehicle 4 in FIG. 3 is thus potentially at a distance which would require a speed reduction of an autopilot, while in FIG. 4, the determined distance is potentially sufficiently large so that no immediate speed adjustment is necessary. The method according to the present invention thus permits brief phases of the "blindness" of the primary distance determination method of a LIDAR system to be bridged without hazard and without additional external sensors being necessary for this purpose. The safety and redundancy of LIDAR systems is thus improved.

Although the present invention was illustrated and described in greater detail by preferred exemplary embodiments, the present invention is not thus restricted by the disclosed examples and other variations may be derived therefrom by those skilled in the art without departing from the scope of protection of the present invention, in view of the disclosure herein.

What is claimed is:

1. A method for supplementary detection of objects by a LIDAR system, the LIDAR system being configured to scan a solid angle range in order to carry out a primary distance determination method for surroundings objects, the LIDAR system including at least one emitter unit and at least one detector unit, and the emitter unit emitting at least one laser beam in a solid angle strip of the solid angle range, laser light reflected from surroundings objects being received by the detector unit in order to ascertain a distance and a position of surroundings objects using the primary distance determination method, the method for supplemental detection comprising the following steps:

scanning the entire solid angle range;

generating a two-dimensional intensity distribution of detected signal light;

generating a corrected two-dimensional intensity distribution by removing blooming signals; and analyzing the corrected two-dimensional intensity distribution for the supplementary detection of surroundings objects in addition to the primary distance determination method, wherein the step of analyzing the corrected two-dimensional intensity distribution includes a step of object recognition in the corrected two-dimensional intensity distribution, wherein after the step of object recognition, those undetermined objects, to which a distance could not be assigned by the primary distance determination method of the LIDAR system, have a distance calculated by a size comparison to another known object in the corrected two-dimensional intensity distribution, for which a distance has been determined by the primary distance determination method.

2. The method as recited in claim 1, wherein the step of analyzing the corrected two-dimensional intensity distribution further includes analyzing homogeneity of the corrected two-dimensional intensity distribution.

3. The method as recited in claim 1, wherein the blooming signals to be removed are identified in that the two-dimensional intensity distribution is searched for spatial intensity profiles characteristic of blooming signals.

4. The method as recited in claim 2, wherein the analyzing of the homogeneity of the corrected two-dimensional intensity distribution takes place along one-dimensional measured value columns and/or measured value lines of the corrected two-dimensional intensity distribution.

5. The method as recited in claim 1, wherein the step of analyzing the corrected two-dimensional intensity distribution further includes a step of object recognition in the corrected two-dimensional intensity distribution.

6. The method as recited in claim 1, wherein the calculation of the distance by the a size comparison uses the following estimation formula:

$$d_U = d_B \frac{P_B \cdot A_U}{P_U \cdot A_B}$$

$d_U$ being the distance of an undetermined object, $d_B$ being the distance of a determined object ascertained by the primary distance determination method, $P_U$ being a one-dimensional extension of the undetermined object in pixels, $P_B$ being a corresponding one-dimensional extension of the determined object in pixels, $A_U$ being a typical one-dimensional extension of the undetermined object, and $A_B$ being a typical one-dimensional extension of the determined object, and wherein the undetermined object is at least one of the undetermined objects to which the distance could not be assigned by the primary distance determination method, and the determined object is the other known object for which the distance has been determined by the primary distance determination method.

7. The method as recited in claim 1, wherein multiple distance determinations are carried out for the same object by various pixel lines and/or pixel columns and their result is averaged to achieve an improved distance determination.

8. A LIDAR system, comprising:

at least one emitter unit;

at least one detector unit; and a control unit which is configured supplementary detection of objects, the LIDAR system being configured to scan a solid angle range in order to carry out a primary distance determination method for surroundings objects, the emitter unit configured to emit at least one laser beam in a solid angle strip of the solid angle range, laser light reflected from surroundings objects being received by the detector unit in order to ascertain a distance and a position of surroundings objects using the primary distance determination method, the control unit being configured to:

scan the entire solid angle range;

generate a two-dimensional intensity distribution of detected signal light;

generate a corrected two-dimensional intensity distribution by removing blooming signals; and analyze the corrected two-dimensional intensity distribution for the supplementary detection of surroundings objects in addition to the primary distance determination method, wherein the step of analyzing the corrected two-dimensional intensity distribution includes a step of object recognition in the corrected two-dimensional intensity distribution, wherein after the step of object recognition, those undetermined objects, to which a distance could not be assigned by the primary distance determination method of the LIDAR system, have a distance calculated by a size comparison to another known object in the corrected two-dimensional intensity distribution, for which a distance has been determined by the primary distance determination method.

9. The LIDAR system as recited in claim 8, wherein the at least one detector unit includes a plurality of detector elements which are avalanche photodiodes and/or single photon avalanche diodes.

* * * * *